United States Patent
Ho et al.

(10) Patent No.: US 11,474,632 B1
(45) Date of Patent: Oct. 18, 2022

(54) TOUCHPAD MODULE

(71) Applicant: Chicony Power Technology Co., Ltd., New Taipei (TW)

(72) Inventors: Hsuan-Wei Ho, New Taipei (TW); Wen-Yen Wang, New Taipei (TW); Ting-Wei Chang, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 17/493,850

(22) Filed: Oct. 5, 2021

(30) Foreign Application Priority Data

Jul. 26, 2021 (TW) .................................. 110127411

(51) Int. Cl.
*G06F 3/041* (2006.01)
*F21V 8/00* (2006.01)

(52) U.S. Cl.
CPC ......... *G06F 3/0412* (2013.01); *G02B 6/0055* (2013.01)

(58) Field of Classification Search
None
See application file for complete search history.

(56) References Cited

U.S. PATENT DOCUMENTS

| | | |
|---|---|---|
| 10,564,764 B2 | 2/2020 | Li |
| 2014/0132569 A1 | 5/2014 | Lien et al. |
| 2016/0313496 A1* | 10/2016 | Hirayama ............ G02B 6/0055 |
| 2018/0156958 A1* | 6/2018 | Yoshida ............... G02B 6/0018 |
| 2019/0317272 A1* | 10/2019 | Lin ....................... G02B 6/0055 |
| 2020/0073047 A1* | 3/2020 | Jeong ................... G02B 6/0083 |
| 2020/0301523 A1 | 9/2020 | Ho et al. |
| 2021/0064156 A1 | 3/2021 | Ho et al. |

FOREIGN PATENT DOCUMENTS

| | | |
|---|---|---|
| CN | 101751176 | 6/2010 |
| CN | 112447434 | 3/2021 |
| TW | 201500815 | 1/2015 |
| TW | I714425 | 12/2020 |
| TW | 202109935 | 3/2021 |
| TW | I720774 | 3/2021 |

* cited by examiner

*Primary Examiner* — Brian M Butcher
(74) *Attorney, Agent, or Firm* — JCIPRNET

(57) ABSTRACT

A touchpad module including a light guide plate, a circuit board, a light source, a reflective layer, a thin film, a touch substrate, a cover, and a low light-transmission layer is provided. The light source is disposed on one side of the incident surface of the light guide plate. The thin film overlaps a light-exit surface, a distant surface, and a bottom surface of the light guide plate, and has a first end side and a second end side. The first end side is fixed to a side edge area of the light-exit surface. The second end side is fixed to the reflective layer. The cover is located on one side of the light-exit surface of the light guide plate. The thin film is located between the cover and the light guide plate. The low light-transmission layer is disposed on one side of the cover facing the light guide plate.

17 Claims, 12 Drawing Sheets

TOUCHPAD MODULE

CROSS-REFERENCE TO RELATED APPLICATION

This application claims the priority benefit of Taiwan application serial no. 110127411, filed on Jul. 26, 2021. The entirety of the above-mentioned patent application is hereby incorporated by reference herein and made a part of this specification.

BACKGROUND

Technical Field

The disclosure relates to a touchpad module providing suitable brightness and good uniformity, which is capable of improving issues like light leakage on the side or black bars at the edges of the touchpad module.

Description of Related Art

As the development and application of electronic technology are getting wider, people relies on all sorts of input devices to input data or for other control. Among those devices, touch pads are often used in electronic products, such as mouse pads, drawing boards, or any touch-pad products with the display function, due to their small area required for installation and their operational convenience.

Generally speaking, a cover is usually directly attached to the light-exit surface of a light guide plate (LGP) with a light-transmitting adhesive layer. However, unlike a general touch panel, the glass cover of the touch panel is usually printed with a translucent ink layer on its back. Since the light-transmitting adhesive layer and the light guide plate have similar refractive index, light may be absorbed easily by the translucent ink layer when the light is transmitted laterally in the light guide plate and the light-transmitting adhesive layer, making the brightness of the touch panel too low. In addition, although the touchpad module equipped with an edge-type backlight assembly has a lighter and thinner appearance, it is prone to problems such as uneven brightness of the touchpad, light leakage on the side, or black bars at the edges, resulting in poor taste in appearance that affects customer's user experience.

SUMMARY

The present disclosure provides a touchpad module providing suitable brightness and good uniformity, which is capable of improving issues like light leakage on the side or black bars at the edges of the touchpad module.

The touchpad module of the present disclosure includes a light guide plate, a circuit board, a light source, a reflective layer, a thin film, a touch substrate, a cover, and a low light-transmission layer. The light guide plate has a light-exit surface, a bottom surface, a light-entrance surface and a distant surface. The light-exit surface is connected to the light-entrance surface and the distant surface, and is opposite to the bottom surface. The circuit board is disposed on one side of the bottom surface of the light guide plate, and has a base portion and an extension portion. The base portion overlaps the light guide plate. The extension portion is connected to the base portion and protrudes from the light-entrance surface. The light source is disposed on the extension portion and is located on one side of the light-entrance surface of the light guide plate. The reflective layer is disposed on one side of the bottom surface of the light guide plate and is located between the light guide plate and the base portion of the circuit board. The thin film overlaps the light-exit surface, the distant surface, and the bottom surface. The thin film has a first end side and a second end side opposite to each other. The first end side is fixed to a side edge area of the light-exit surface connected to the light entrance surface by a connecting member, and the second end side is fixed to the reflective layer. The touch substrate is located on one side of the bottom surface of the light guide plate. The thin film is located between the touch substrate and the light guide plate. The cover is disposed on one side of the light-exit surface of the light guide plate. The thin film is located between the cover and the light guide plate. The low light-transmission layer is disposed on one side of the cover facing the light guide plate.

In an embodiment of the present disclosure, an air layer is provided between the thin film and the light-exit surface of the touchpad module.

In an embodiment of the present disclosure, the maximum height of the air layer of the touchpad module along a first direction is equal to the thickness of the connecting member along the first direction.

In an embodiment of the present disclosure, the height of the air layer of the touchpad module along the normal direction of the light-exit surface decreases as the air layer is further away from the connecting member.

In an embodiment of the present disclosure, the light source of the touchpad module is adapted to emit a light toward the light-entrance surface. The light is transmitted through the light guide plate in a direction away from the light source and emerges from the light-exit surface toward the cover.

In an embodiment of the present disclosure, the touchpad module further includes a light-shielding plate, which is disposed on one side of the thin film away from the light guide plate and is adapted to shield the side edge area of the light-exit surface and the light source.

In an embodiment of the present disclosure, the cover of the touchpad module is attached to the thin film with a light-transmitting adhesion layer, and the connecting member is an opaque adhesion layer.

In an embodiment of the present disclosure, the second end side of the thin film of the touchpad module is fixed to the reflective layer through an adhesive layer. The adhesive layer has a plurality of adhesion patterns and a plurality of gaps disposed between at least part of the adhesion patterns.

In an embodiment of the present disclosure, the gaps of the touchpad module are a plurality of slots communicating with each other, and any two adjacent ones of the adhesion patterns are provided with one of the slots.

In an embodiment of the present disclosure, the gaps of the touchpad module are a plurality of notches, and any two adjacent ones of the at least part of the adhesion patterns are partially connected to form one of the notches.

In an embodiment of the present disclosure, the light guide plate of the touchpad module further includes a first side surface and a second side surface. The first side surface and the second side surface are opposite to each other, and are respectively connected to the light entrance surface, the light-exit surface, the distant surface, and the bottom surface. The thin film further includes a first side wing and a second side wing. The first side wing and the second side wing respectively overlap the first side surface and the second side surface of the light guide plate, and are fixed to the reflective layer.

In an embodiment of the present disclosure, the first side wing and the second side wing of the thin film of the touchpad module are fixed to the reflective layer through an adhesive layer. The adhesive layer has a plurality of adhesion patterns and a plurality of gaps disposed between the adhesion patterns.

In an embodiment of the present disclosure, the gaps of the touchpad module are a plurality of slots communicating with each other, and any two adjacent ones of the adhesion patterns are provided with one of the slots.

In an embodiment of the present disclosure, the gaps of the touchpad module are a plurality of gaps, and any two adjacent ones of the at least part of the adhesion patterns are partially connected to form one of the notches. In an embodiment of the present disclosure, the adhesive layer of the touchpad module is divided into a first part and a second part that are separated from each other, and the first side wing and the second side wing are fixed to the reflective layer respectively through the first part and the second part.

In an embodiment of the present disclosure, the low light-transmission layer of the touchpad module is disposed on a surface of the cover facing the thin film.

In an embodiment of the present disclosure, the second end side of the thin film of the touchpad module is fixed to the reflective layer through an adhesive layer, and an entire surface of the adhesive layer covers the second end side.

Based on the above, in the touchpad module of an embodiment of the present disclosure, the first end side of the thin film is fixed to a side edge area of the light-exit surface of the light guide plate connecting the light-entrance surface through a connecting member, and the second end side of the thin film is fixed to the reflective layer of the bottom surface of the light guide plate. The configuration of the thin film prevents the low light-transmission layer between the light guide plate and the cover from directly contacting the light guide plate, thereby solving the problem of light energy loss due to the absorption of the low light-transmission layer when the light is transmitted in the light guide plate. In other words, the total brightness and uniformity of the light emitted by the light source that emerges from the light-exit surface of the light guide plate may be increased, thereby improving the taste in the appearance of the touchpad module.

To make the present disclosure more comprehensible, the following embodiments are given in conjunction with the accompanying drawings to describe in detail as follows.

DESCRIPTION OF THE EMBODIMENTS

Figure 1:
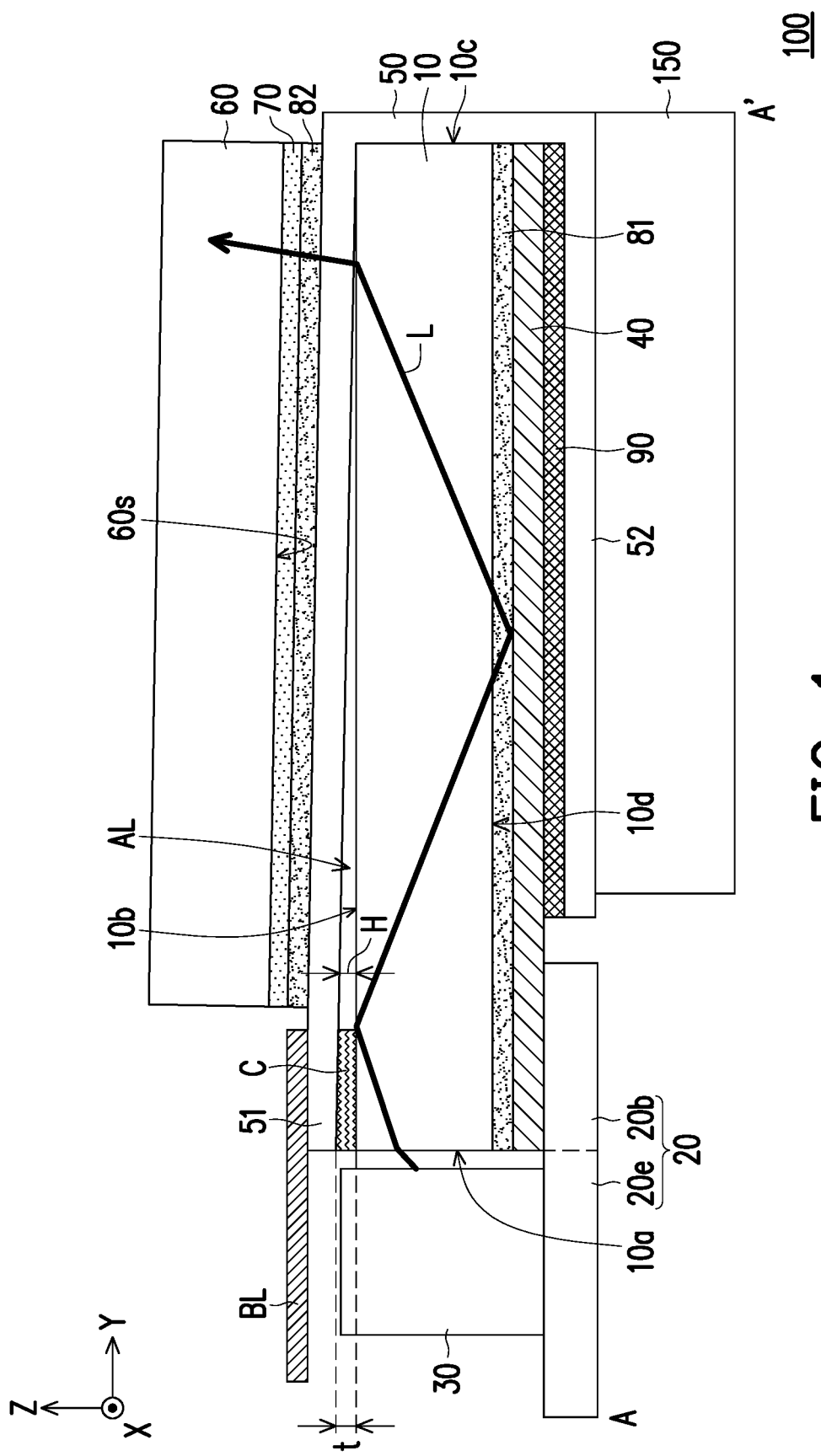
FIG. 1 is a schematic cross-sectional view of a touchpad module according to a first embodiment of the present disclosure.

The disclosure may be understood by referring to the following detailed description and the accompanying drawings. It should be duly noted that, for the ease of readers' comprehension and the simplicity of the drawings, the drawings of this disclosure only illustrate parts of the electronic device, and the specific elements in the drawings may not be drawn to the actual scale ratio. Also, the number and size of each element in the drawings are only for schematic use, and do not limit the scope of the disclosure. For example, the relative size, thickness, and location of each region and/or structure may be reduced or enlarged for clarity.

The directional terms mentioned in this text, such as "upper," "lower," "front," "rear," "left," "right," merely refer to directions in the drawings. Therefore, the directional terms used are used for purposes of illustration and not to limit the present disclosure. It should be understood that when an element or film layer is referred to as being "on" or "connected" to another element or film layer, the element or film layer may be directly on the other element or film layer, or directly connected to the other element or film layer, or there is an intervening element or film layer there between (an indirect situation). Conversely, when an element or film layer is referred to be "directly" on or "directly connected" to another element or film layer, there is no intervening element or film layer there between.

In the following embodiments, the same or similar elements are designated with the same or similar reference numerals, and descriptions thereof will be omitted. In addition, features of different embodiments may be adapted in combination with one another as long as they do not violate or in conflict with the spirit of the disclosure, and simple equivalent changes and modifications made according to the specification or the claims are within the scope of the disclosure. In addition, the terms such as "first" and "second" mentioned in the specification or the claims are only used to name discrete elements or to distinguish different embodiments or scopes and are not intended to limit the upper or lower limit of the number of the elements, nor are they intended to limit the manufacturing order or disposition order of the elements.

Figure 2:
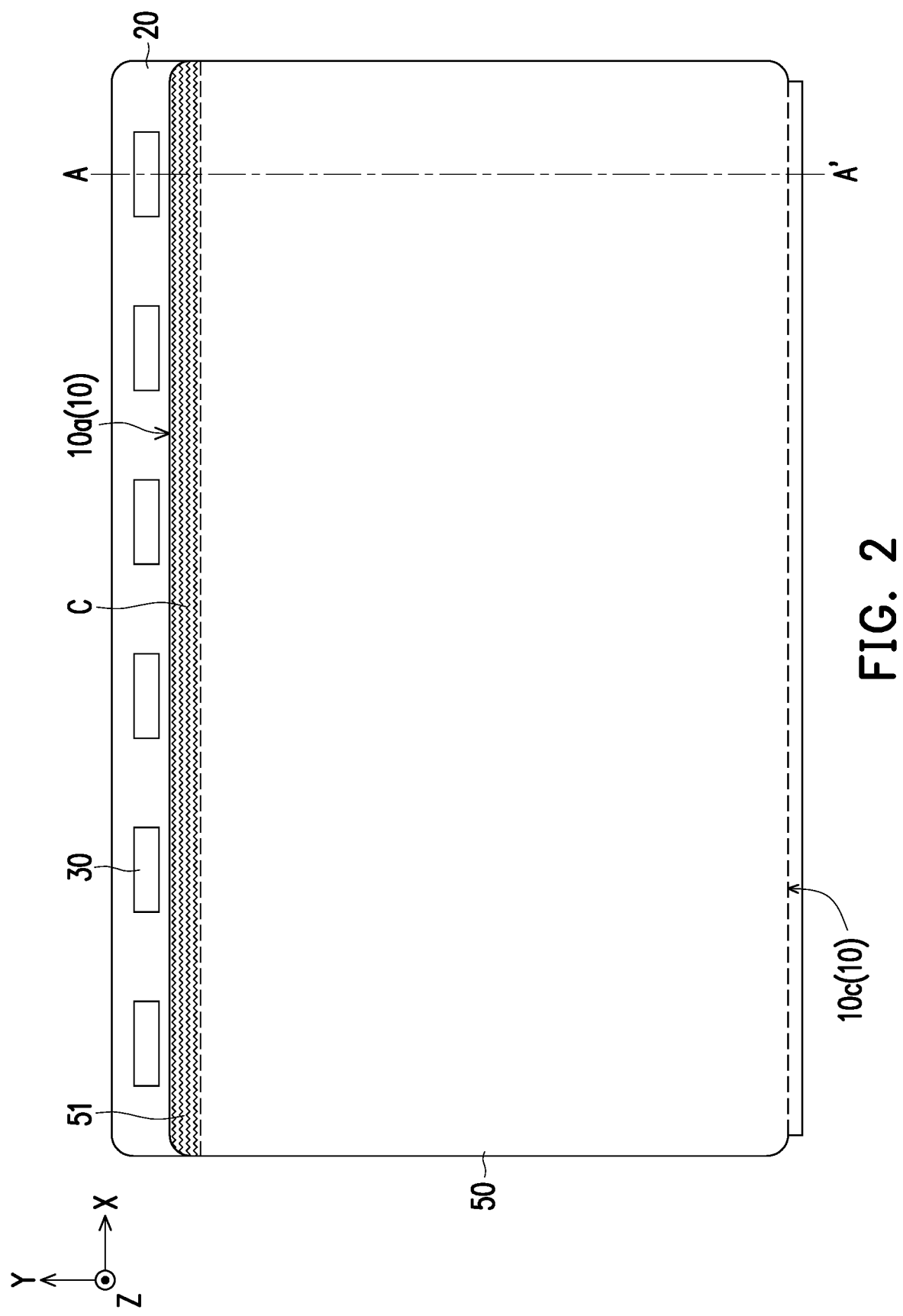
FIG. 2 is a schematic top view of the touchpad module of FIG. 1.
Figure 3A:
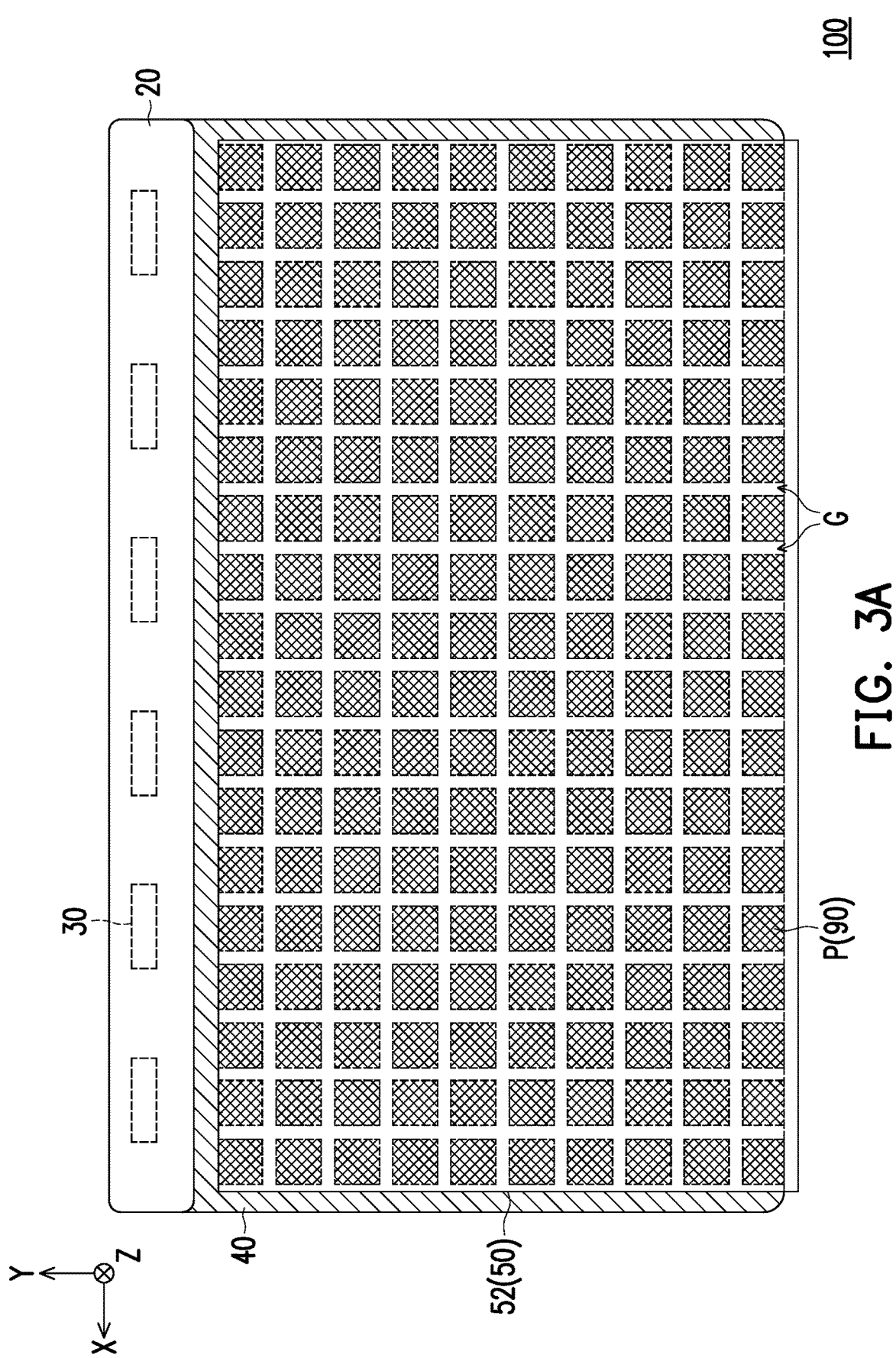
FIG. 3A is a schematic bottom view of the touchpad module of FIG. 1.
Figure 3B:
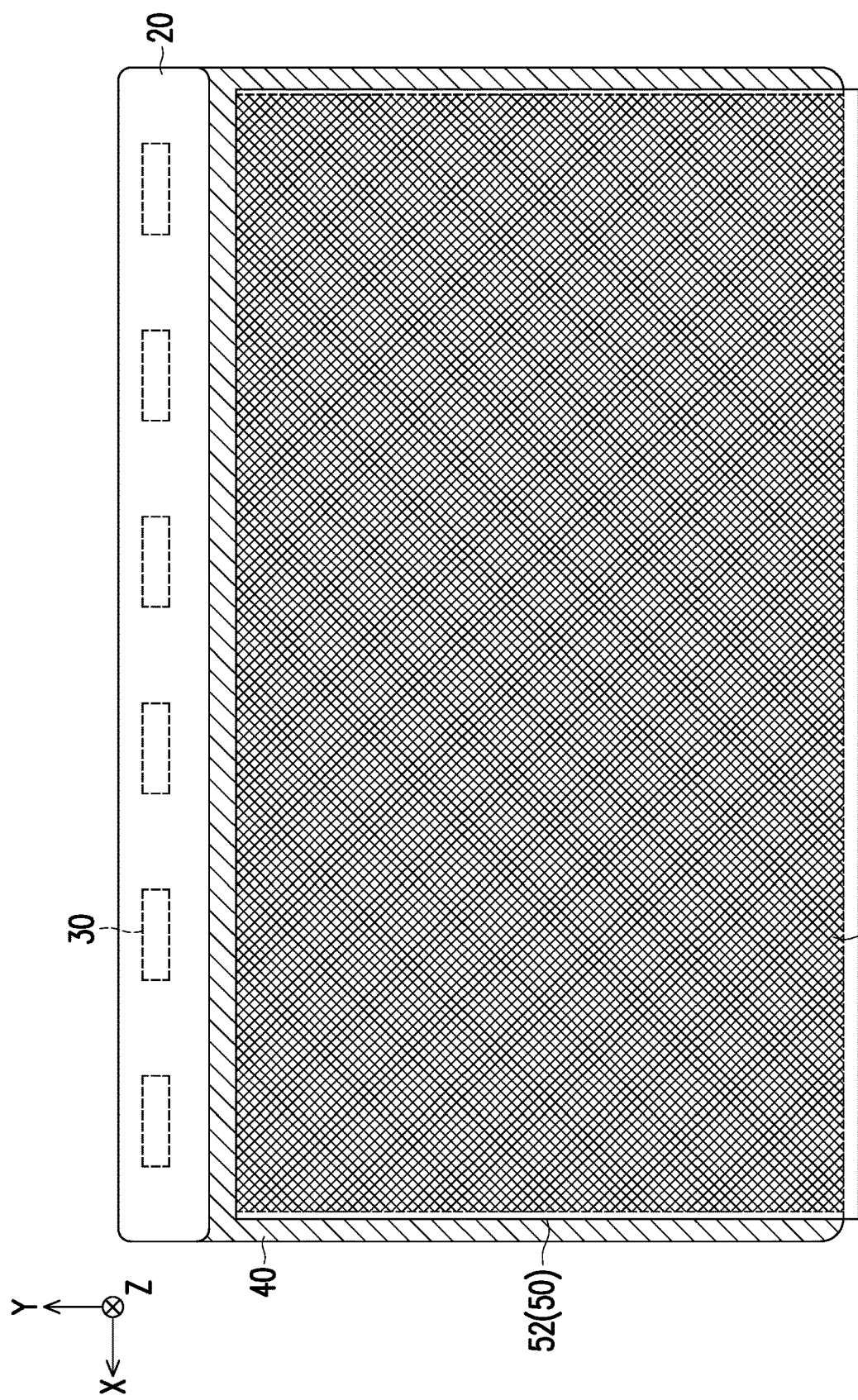
FIG. 3B is a schematic bottom view of another embodiment of the adhesive layer of FIG. 3A.
Figure 4A:
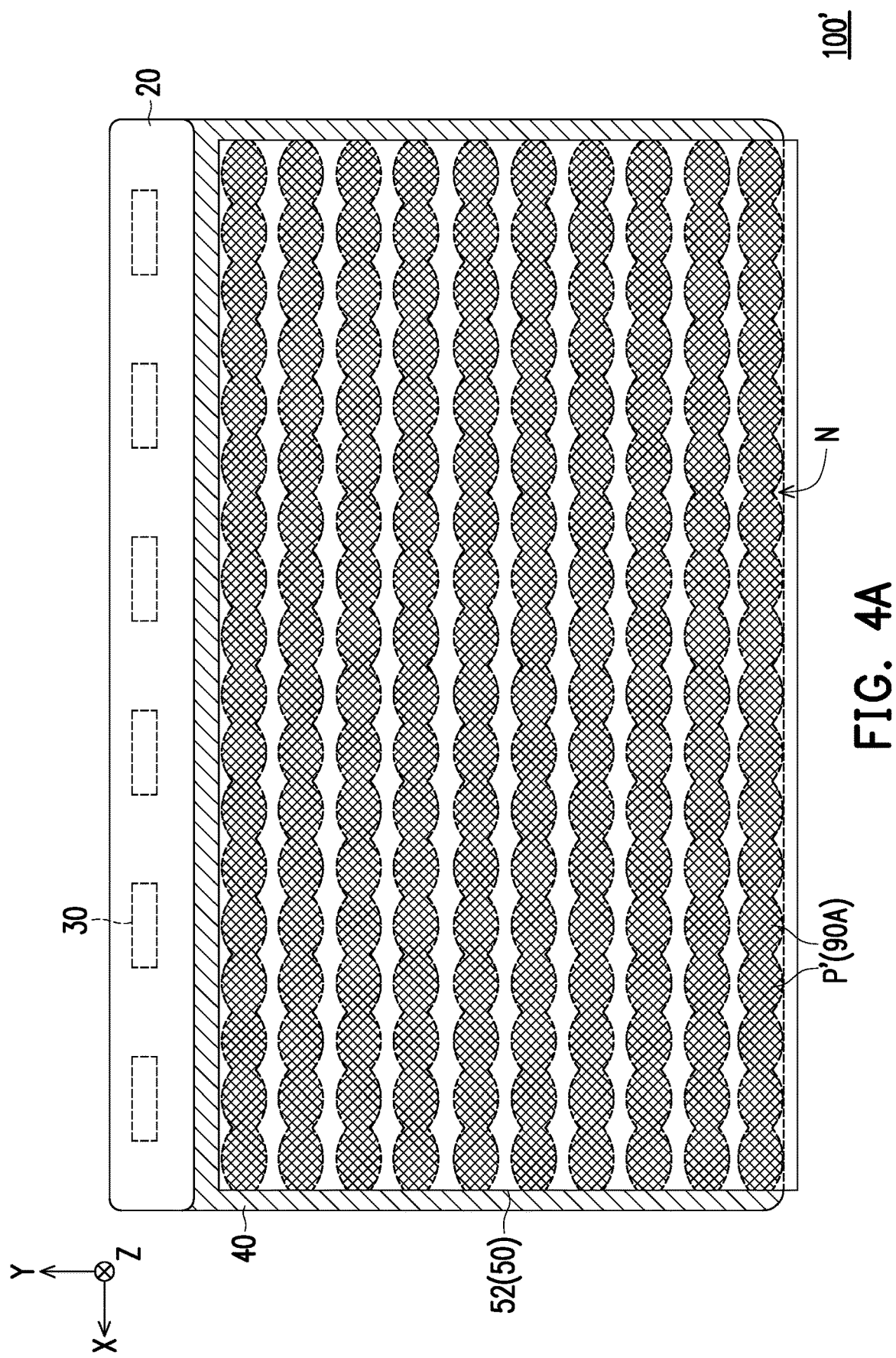
FIG. 4A and FIG. 4B are schematic bottom views of modified embodiments of the touchpad module of FIG. 3A.
Figure 4B:
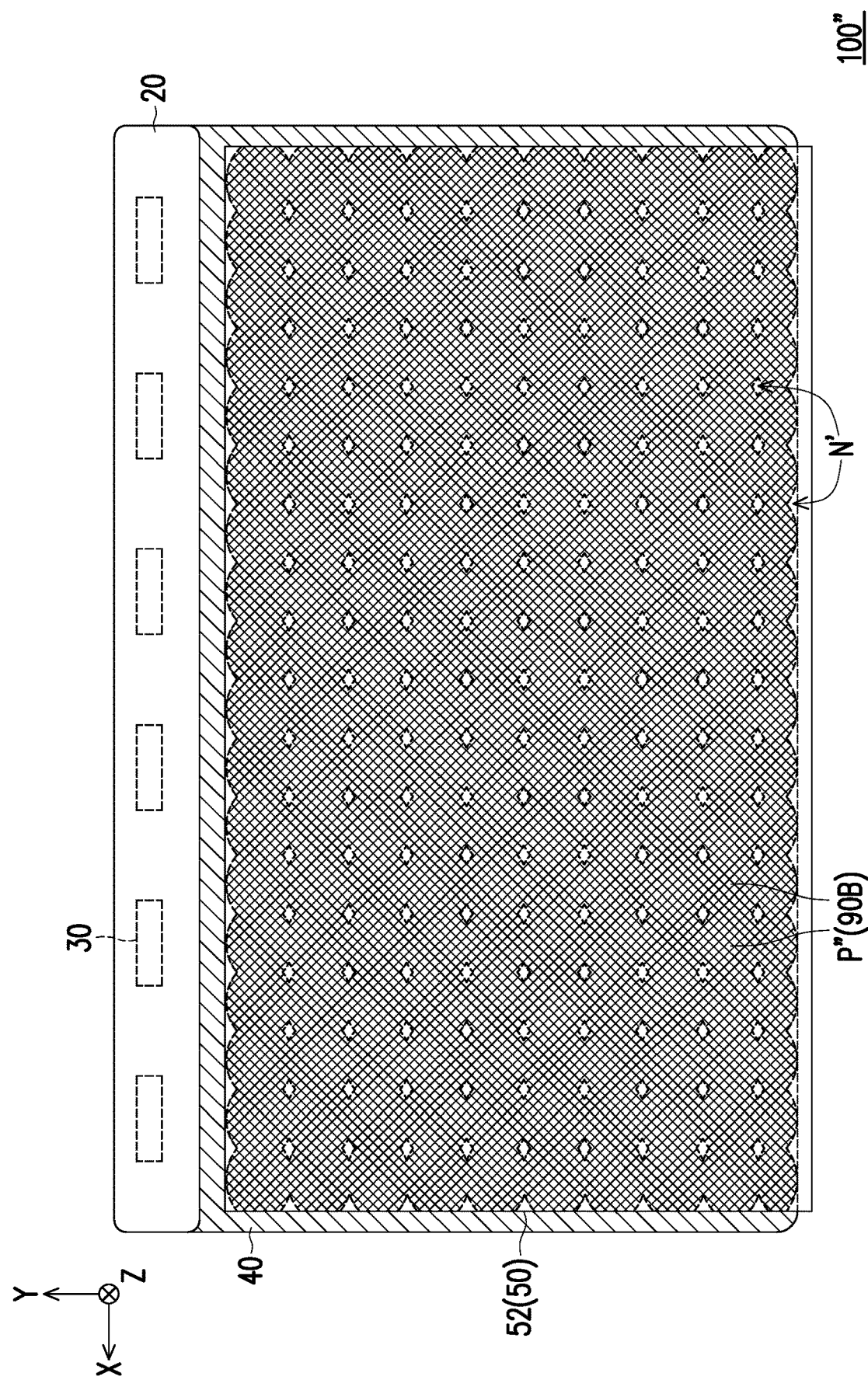

FIG. 1 is a schematic cross-sectional view of a touchpad module according to a first embodiment of the present disclosure. FIG. 2 is a schematic top view of the touchpad module of FIG. 1. FIG. 1 corresponds to the section line AA' in FIG. 2. FIG. 3A is a schematic bottom view of the touchpad module of FIG. 1. FIG. 3B is a schematic bottom view of another embodiment of the adhesive layer of FIG. 3A. FIG. 4A and FIG. 4B are schematic bottom views of modified embodiments of the touchpad module in FIG. 3A. For the sake of clarity, FIG. 2 only illustrates a light guide plate 10, a circuit board 20, a light source 30, and a thin film 50 of FIG. 1, and FIG. 3A omits illustrating the touch substrate 150 in FIG. 1.

In FIG. 1 and FIG. 2, a touchpad module 100 includes a light guide plate 10, a circuit board 20, a light source 30, and a reflective layer 40. The light guide plate 10 has a light-entrance surface 10a, a light-exit surface 10b, a distant surface 10c, and a bottom surface 10d. The light-exit surface 10b is connected to the light-entrance surface 10a and the distant surface 10c, and is opposite to the bottom surface 10d. The material of the light guide plate 10 includes, for example, polymethacrylate, polyolefin, or polycarbonate, but it is not limited thereto.

The circuit board 20 is disposed on one side of the bottom surface 10d of the light guide plate 10, and has a base portion 20b and an extension portion 20e. The extension portion 20e is connected to the base portion 20b and protrudes from the light-entrance surface 10a of the light guide plate 10. For example, the circuit board 20 may be a printed circuit board (PCB), a metal core printed circuit board (MCPCB), a flexible PCB, or other suitable circuit boards.

The light source 30 is disposed on the extension portion 20e of the circuit board 20 and is located on one side of the light-entrance surface 10a of the light guide plate 10. The light source 30 is adapted to emit a light L toward the light-entrance surface 10a of the light guide plate 10, and the light L is transmitted through the light guide plate 10 in a direction away from the light source 30, and emerges from the light-exit surface 10b of the light guide plate 10. In this embodiment, the light source 30 may be a combination of multiple light-emitting diodes (LED), and the light-emitting diodes are, for example, sub-millimeter LED (mini LED) or micro LED, but it is not limited thereto. In other embodiments, the light source 30 may also be a cold cathode fluorescent lamp (CCFL).

In this embodiment, the reflective layer 40 is disposed on one side of the bottom surface 10d of the light guide plate 10 and is located between the light guide plate 10 and the base portion 20b of the circuit board 20. More specifically, the reflective layer 40 is attached to the bottom surface 10d of the light guide plate 10 through a light-transmitting adhesion layer 81. The material of the light-transmitting adhesion layer 81 includes, for example, optical clear adhesive (OCA), optical clear resin (OCR), or other suitable optical adhesives. Since part of the light L emitted by the light source 30 emerges from the bottom surface 10d of the light guide plate 10 during its transmission in the light guide plate 10, causing the loss of light energy, the configuration of the reflective layer 40 may reflect the light L back to the light guide plate 10, thereby improving the light-energy utilization rate of the touchpad module 100.

Furthermore, the base portion 20b of the circuit board 20 overlaps the light guide plate 10 along the normal direction (for example, a direction Z) of the light-exit surface 10b. For example, the circuit board 20 may be fixed on the surface of the reflective layer 40 facing away from the light guide plate 10 through an adhesive (not shown) provided on the surface of the base portion 20b, but it is not limited thereto. In other embodiments, the fixing relationship between the circuit board 20 and the reflective layer 40 (or the light guide plate 10) may also be realized by other suitable joints.

Moreover, the touchpad module 100 further includes a thin film 50 and a cover 60. The thin film 50 overlaps the light-exit surface 10b, the distant surface 10c, and the bottom surface 10d of the light guide plate 10, and has a first end side 51 and a second end side 52 opposite to each other. The first end side 51 of the thin film 50 is fixed to a side edge area of the light-exit surface 10b connected to the light entrance surface 10a of the light guide plate 10 by a connecting member C, and the second end side 52 of the thin film 50 is fixed to the reflective layer 40 through the adhesive layer 90. The material of the thin film 50 is, for example, polyethylene terephthalate (PET), polyimide (PI), or other suitable and light-transmitting flexible substrates.

Note that an air layer AL is provided between the thin film 50 and the light-exit surface 10b of the light guide plate 10, and a height H of the air layer AL along the normal direction of the light-exit surface 10b (for example, the direction Z) decreases as the air layer is further away from the connecting member C. For example, the thin film 50 may abut on the distant surface 10c of the light guide plate 10, and its two end sides are stretched away from the distant surface 10c, so that the orthographic projection of the air layer AL between the thin film 50 and the light-exit surface 10b of the light guide plate 10 on the YZ plane presents a wedge-shaped profile. From another point of view, a thickness t of the connecting member C along the direction Z defines the maximum height H of the air layer AL. In other words, the maximum value (i.e., the maximum height) of the height H of the air layer AL may be equal to the thickness t of the connecting member C.

The cover 60 is disposed on one side of the light-exit surface 10b of the light guide plate 10, and the thin film 50 is located between the cover 60 and the light guide plate 10. Note that the cover 60 is attached to the thin film 50 through the light-transmitting adhesion layer 82. Since most of the substrate material of the cover 60 like glass, quartz, or other suitable high-molecular polymers (such as polycarbonate) has a certain stiffness, the bonding relationship between the cover 60 and the thin film 50 may increase the surface flatness of the part where the thin film 50 overlaps the light-exit surface 10b of the light guide plate 10. In other words, it prevents the surface of the air layer AL defined by the thin film 50 from wrinkles that affects the touch sensing function and the overall taste in appearance (such as optical water ripples). However, the present disclosure is not limited thereto. In other embodiments, the material of the cover 60 may also be a polyester material, such as Mylar. In this embodiment, the material of the light-transmitting adhesion layer 82 includes, for example, optical clear adhesive (OCA), optical clear resin (OCR), or other suitable optical adhesives.

In order to make the components (for example, the reflective layer 40) on the back of the cover 60 more concealable, the touchpad module 100 is further provided with a low light-transmission layer 70 on one side of the cover 60 facing the light guide plate 10, and the low light-transmission layer 70 is located between the light guide plate 10 and the cover 60. In this embodiment, the low light-transmission layer 70 may be selectively disposed on a surface 60s of the cover 60 facing the thin film 50, but it is not limited thereto. For example, the low light-transmission layer 70 may be formed by directly printing a translucent ink on the surface 60s of the cover 60.

Since the refractive index of the light-transmitting adhesion layer 82 is equivalent to the refractive index of the light guide plate 10, if the cover 60 printed with the low light-transmission layer 70 on its back is attached to the light-exit surface 10b of the light guide plate 10 directly with the light-transmitting adhesion layer 82, the light L's number of times of total reflection in the light guide plate 10 at the side near the light-exit surface 10b is reduced, which makes the brightness of the light emitted by the light source 30 uneven when it emerges from the light-exit surface 10b of the light guide plate 10. In addition, since the low light-transmission layer 70 has certain light absorption characteristics, when part of the light is transmitted to the low light-transmission layer 70 during its lateral transmission in the light guide plate 10, the light energy is lost.

Therefore, in this embodiment, by increasing the difference between the refractive index of the air layer AL between the thin film 50 and the light guide plate 10 and the refractive index of the light guide plate 10, the probability of the light L emitted by the light source 30 emerging from the light guide plate 10 that irradiates the low light-transmission layer 70 during the lateral transmission may be reduced, thereby improving the total brightness and the uniformity of the light source 30 when emerging from the light output surface 10*b* of the light guide plate 10.

Also, the thin film 50 of this embodiment extends from the light-exit surface 10*b* of the light guide plate 10 to the bottom surface 10*d* of the light guide plate 10 through the distant surface 10*c*. In other words, the distant surface 10*c* of the light guide plate 10 is covered by the folded film 50. Accordingly, the problem of black bars appearing at the edges caused by the overflow of glue on the periphery of the light guide plate or the cutting defect of the light guide plate in the general light-transmitting adhesion layer may be improved, and the degree of light leakage of the light guide plate 10 on the distant surface 10*c* side may be reduced.

Please also refer to FIG. 3A at the same time. The adhesive layer 90 connects the second end side 52 of the thin film 50 and the reflective layer 40. The adhesive layer 90 may have a plurality of adhesion patterns P, and a plurality of gaps G are disposed between the adhesion patterns P. These gaps G communicate with each other to form a plurality of slots. And these slots may be used as air exhaust passages for the adhesive layer 90 attaching the reflective layer 40 to the second end side 52 of the thin film 50, so as to avoid the air bubbles from forming between the adhesive layer 90 and the reflective layer 40 (or the second end side 52 of the thin film 50). In other words, the flatness of the touchpad module 100 may be increased to meet the integration requirements of various applications.

However, the present disclosure is not limited thereto. In another modified embodiment, a plurality of adhesion patterns P' of an adhesive layer 90A of a touchpad module 100' may be connected to each other along a direction X (or a direction Y) to form a plurality of notches N, and the notches N communicate with each other to form air exhaust channels extending in the direction X of the adhesive layer 90A (as shown in FIG. 4A). In yet another modified embodiment, a plurality of adhesion patterns P'' of an adhesive layer 90B of a touchpad module 100'' are connected to each other along the direction X and the direction Y at the same time to form a plurality of notches N', and the notches N' are separated from each other (as shown in FIG. 4B).

For example, the steps of forming the adhesive layer 90A of FIG. 4A and the adhesive layer 90B of FIG. 4B may include as follows: an adhesive is distributed on the reflective layer 40 by dotting, and the adhesive is squeezed and spread during the process of attaching the second end side 52 of the thin film 50 to the reflective layer 40 and is cured to form the adhesive layer 90A or the adhesive layer 90B. It should be noted that the configuration and distribution of the notches of the adhesive layer may depend on the spacing of the dotted glue, the amount of glue droplets, and the pressing force when attaching the thin film 50 to the reflective layer 40. Therefore, the present disclosure is not limited to the content disclosed in the drawings.

In yet another modified embodiment, an adhesive layer 90''' of a touchpad module 100*e* may cover a second end side 52 of a thin film 50 with its entire surface (as shown in FIG. 3B). In other words, it is possible that the adhesive layer 90''' does not have the gaps G as in FIG. 3A and the notches N as in FIG. 4A (or FIG. 4B).

Please continue to refer to FIG. 1. The touchpad module 100 further includes a light-shielding plate BL for fixing the first end side 51 of the thin film 50 between the connecting member C and the light-shielding plate BL. The material of the connecting member C may be an opaque adhesion layer, and it is disposed on the side edge area of the light-exit surface 10*b* connected to the light-entrance surface 10*a*. The light-shielding plate BL is disposed on one side of the thin film 50 facing away from the light guide plate 10 and shields the side edge area of the light-exit surface 10*b* and the light source 30. The opaque connecting member C and the light-shielding plate BL may be adapted to shield the light from the light source 30 that does not enter the light-entrance surface 10*a*, or may shield the light 10 whose incident angle at the light guide plate is too small to be reflected completely that directly emerges from the side edge area of the light-entrance surface 10*a*, thereby solving the problem of having excessive brightness of the light guide plate 10 on the side of the light-entrance surface 10*a*. However, the present disclosure is not limited thereto. According to other embodiments, the connecting member C may also be formed by using a light-transmitting adhesive.

In this embodiment, the touchpad module 100 further includes a touch substrate 150 disposed on one side of the bottom surface 10*d* of the light guide plate 10. The thin film 50 is located between the touch substrate 150 and the light guide plate 10. For example, a touch sensing layer (not shown) is provided on the touch substrate 150 to detect the user's touch action. The touch sensing layer may be any touch sensing layer (for example: resistive, self-capacitive, or mutual-capacitive touch sensing layers) for touch sensing substrates that is well-known to those with ordinary knowledge in the art, to which the present disclosure is not limited.

Other embodiments are listed below to describe the disclosure in detail, in which the same components are given the same reference numerals, and the description of the same technical content will be omitted. For the omitted parts, please refer to the previous embodiments, as they are not repeated hereafter.

Figure 5:
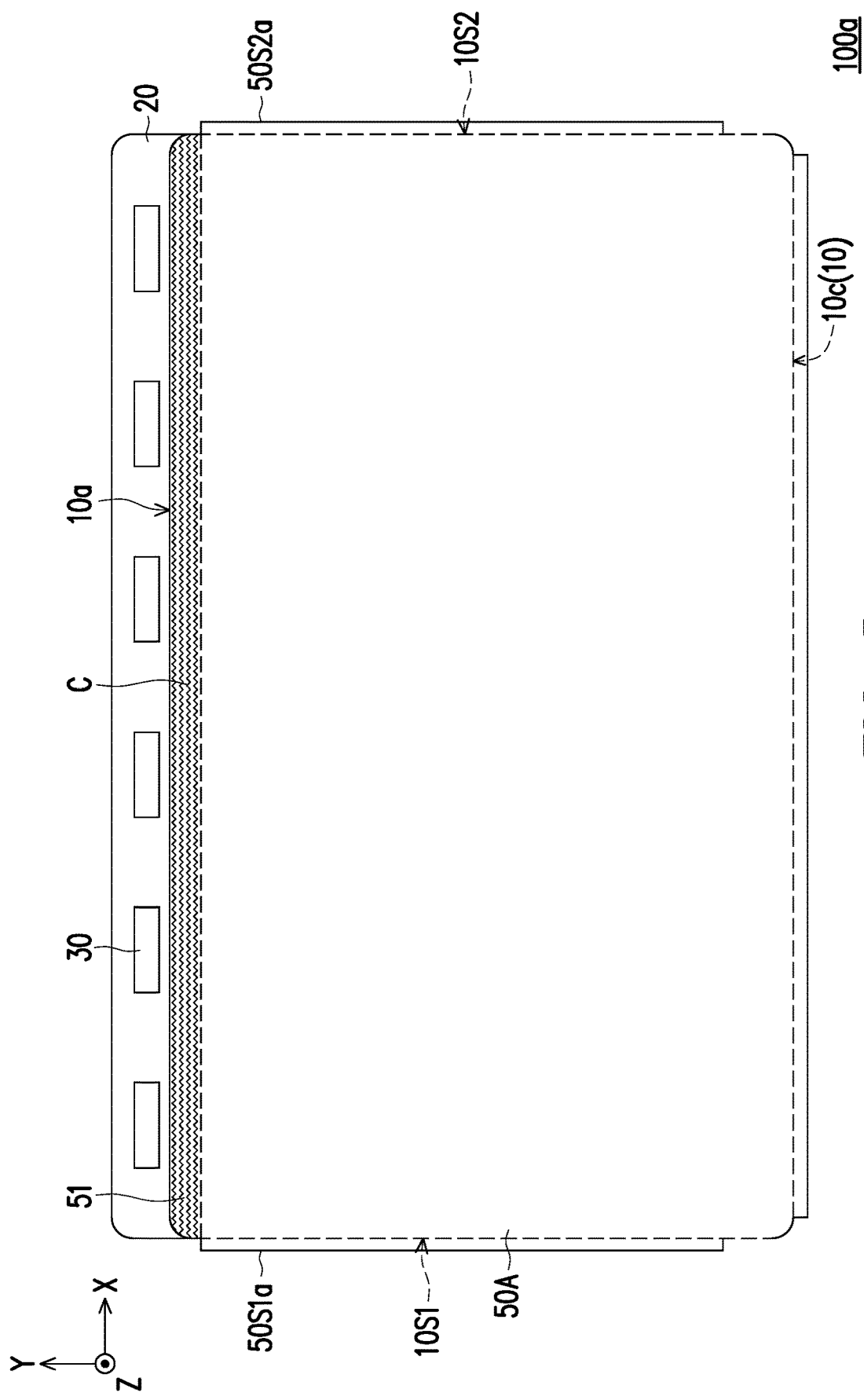
FIG. 5 is a schematic top view of a touchpad module according to a second embodiment of the present disclosure.
Figure 6:
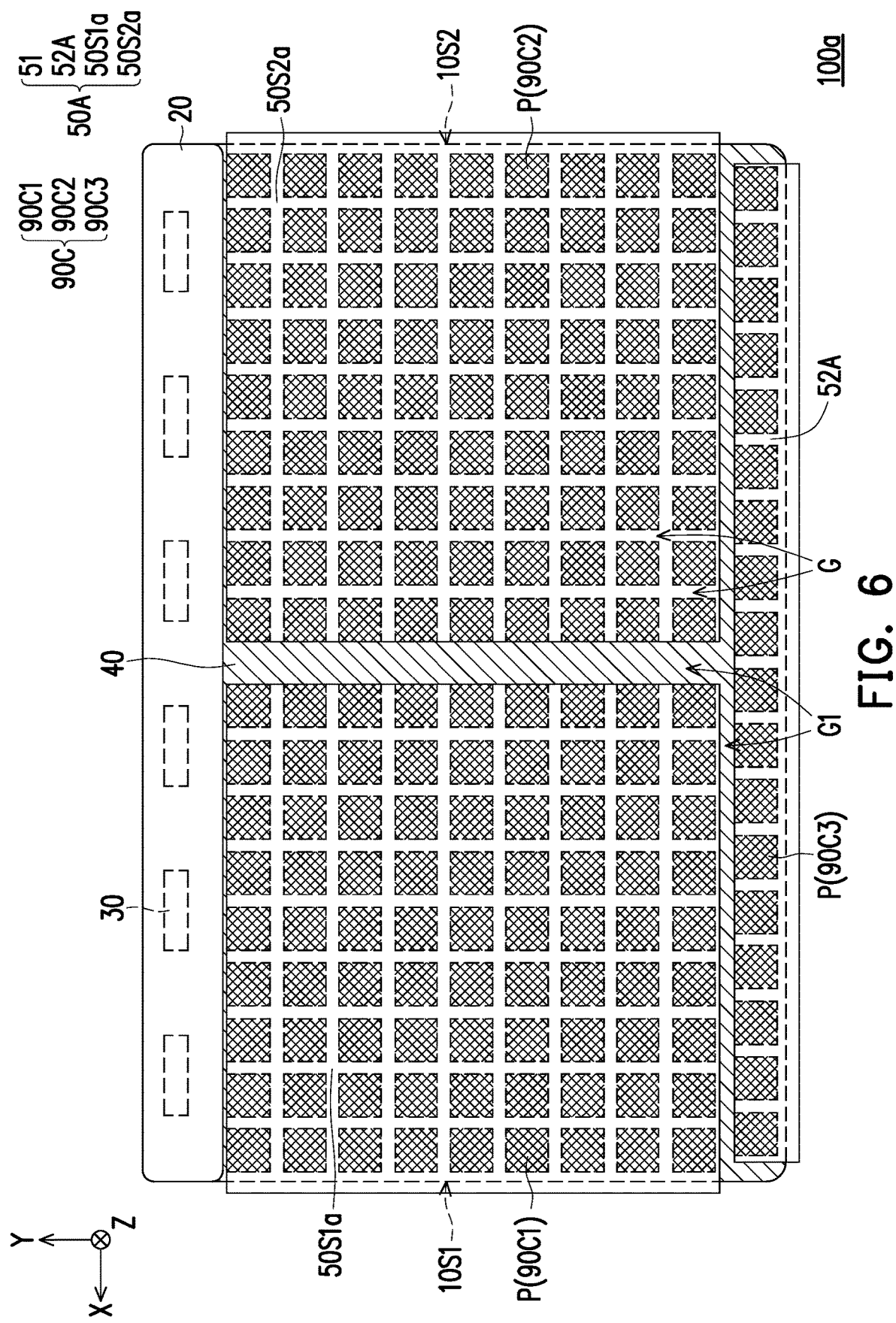
FIG. 6 is a schematic bottom view of the touchpad module of FIG. 5.
Figure 7:
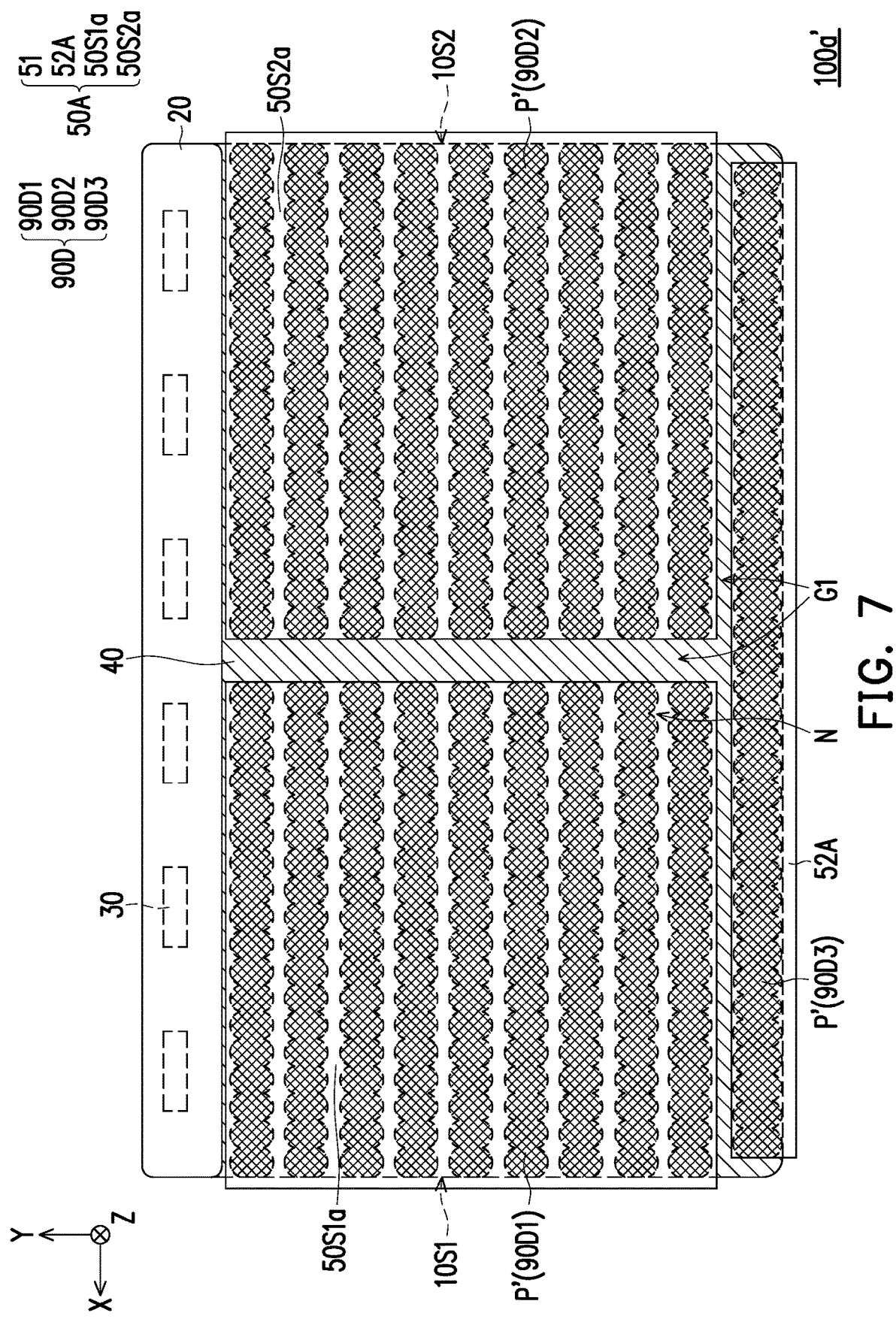
FIG. 7 is a schematic bottom view of a modified embodiment of the touchpad module of FIG. 6.

FIG. 5 is a schematic top view of a touchpad module according to a second embodiment of the present disclosure. FIG. 6 is a schematic bottom view of the touchpad module of FIG. 5. FIG. 7 is a schematic bottom view of another modified embodiment of the touchpad module of FIG. 6.

In FIG. 5 and FIG. 6, the difference between the touchpad module 100*a* of this embodiment and the touchpad module 100 of FIG. 2 is that the thin film 50A of the touchpad module 100*a* further has a first side wing 50S1*a* and a second side wing 50S2*a*. The first side wing 50S1*a* and the second side wing 50S2*a* respectively overlap a first side surface 10S1 and a second side surface 10S2 of the light guide plate 10. The first side surface 10S1 and the second side surface 10S2 are opposite to each other, and are respectively connected to the light entrance surface 10*a*, the light-exit surface 10*b*, the distant surface 10*c*, and the bottom surface 10*d* as shown in FIG. 1.

On the other hand, the adhesive layer 90C of this embodiment may be divided into a first part 90C1, a second part 90C2, and a third part 90C3 that are separated from each other. The first side wing 50S1*a*, the second side wing 50S2*a*, and the second end side 52A are fixed to the reflective layer 40 respectively through the first portion 90C1, the second portion 90C2, and the third portion 90C3. Since the configuration of the adhesion patterns P of the adhesive layer 90C of this embodiment is similar to that of the adhesive layer 90 of FIG. 3A, for detailed description, please refer to the relevant paragraphs of the foregoing embodiment, which are not repeated here.

Different from the thin film 50 of FIG. 3A, in this embodiment, the thin film 50A is attached to the second end side 52A of the reflective layer 40, and the first side wing 50S1a and the second side wing 50S2a are separated from each other. In other words, there may be a gap G1 between the first portion 90C1, the second portion 90C2, and the third portion 90C3 of the adhesive layer 90C. This gap G1 is connected to a plurality of slots (or a plurality of gaps G) between the adhesion patterns P. Therefore, the air exhaustion effect of the adhesive layer 90C during the process of attaching the thin film 50A to the reflective layer 40 may be further improved to avoid the accumulation of bubbles between the thin film 50A and the reflective layer 40. In other words, the flatness of the touchpad module 100a may be increased to meet the integration requirements of various applications.

On the other hand, by folding the first side wing 50S1a and the second side wing 50S2a, the first side surface 10S1 and the second side surface 10S2 of the light guide plate 10 are covered, reducing the degree of light leakage of the light guide plate 10 on the sides of the first side 10S1 and the second side 10S2 and improving the problem of black bars appearing at the edges caused by the overflow of glue on the periphery of the light guide plate 10 or the cutting defect of the light guide plate 10 in the general light-transmitting adhesion layer.

However, the present disclosure is not limited thereto. As shown in FIG. 7, in another modified embodiment, a plurality of adhesion patterns P' of a first portion 90D1, a second portion 90D2, and the third portion 90D3 of the adhesive layer 90D of the touchpad module 100a' may be connected to each other along a direction X (or a direction Y) to form a plurality of notches N, and the notches N communicate with each other to form an exhaust channel extending in the direction X of the adhesive layer 90D. Since the configuration of the adhesion patterns P' of the adhesive layer 90D is similar to that of the adhesive layer 90A in FIG. 4A, for detailed description, please refer to the relevant paragraphs of the foregoing embodiment, as they are not repeated here.

Figure 8:
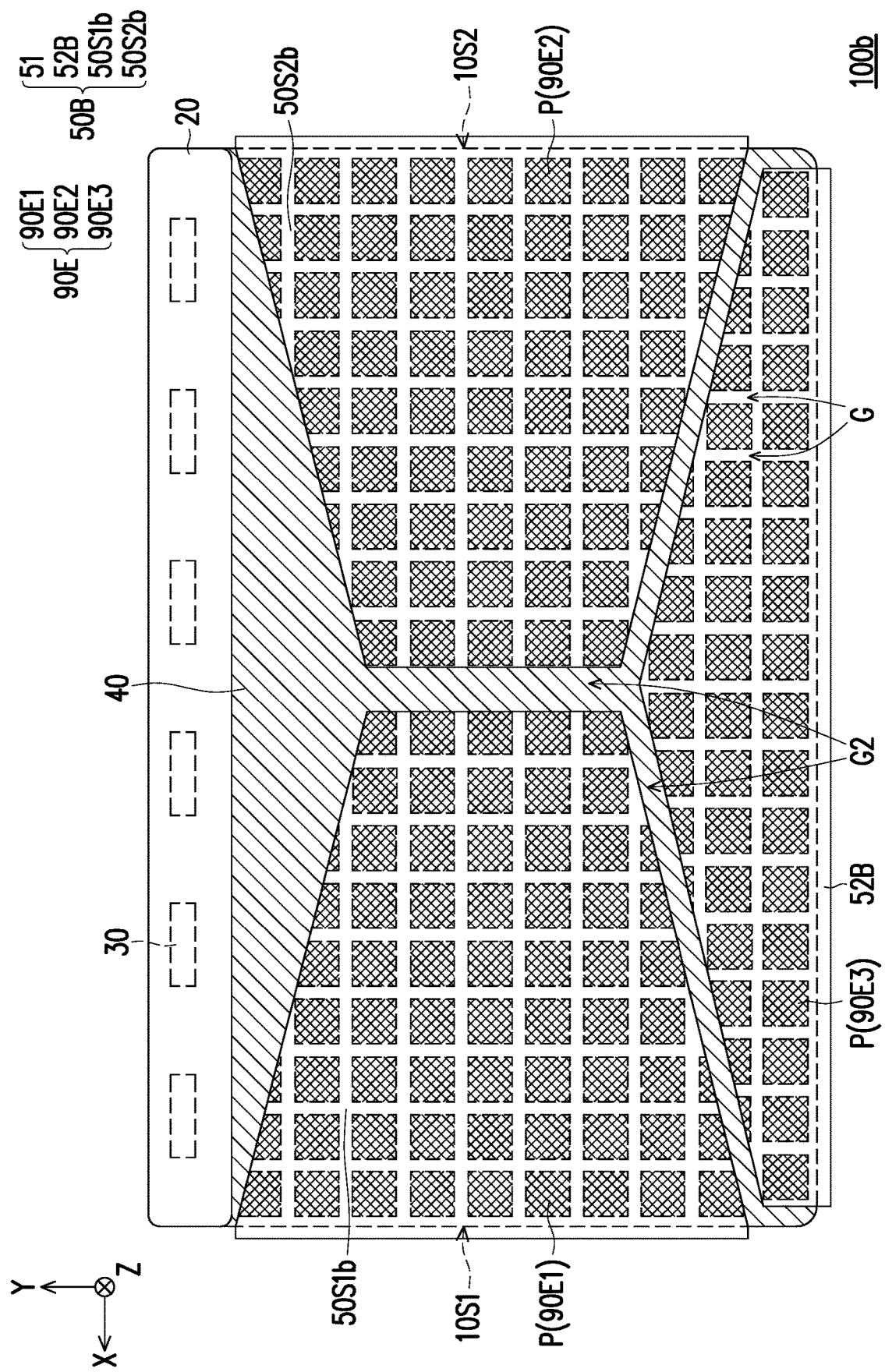
FIG. 8 is a schematic bottom view of a touchpad module according to a third embodiment of the present disclosure.

FIG. 8 is a schematic bottom view of a touchpad module according to a third embodiment of the present disclosure. In FIG. 8, the difference between the touchpad module 100b of this embodiment and the touchpad module 100a of FIG. 6 is that the shape of the first side wing 50S1b, the second side wing 50S2b, and the second end side 52B of the thin film 50B of the touchpad module 100b are different.

In this embodiment, the orthographic projection profile of the first side wing 50S1b and the second side wing 50S2b of the thin film 50B on the reflective layer 40 is a trapezoid, and the orthographic projection profile of the second end side 52B on the reflective layer 40 is a pentagon. Since the thin film 50B is attached to the second end side 52B of the reflective layer 40, the first side wing 50S1b and the second side wing 50S2b are separated from each other, and thus there may also be a gap G2 between the first portion 90E1, the second portion 90E2, and the third portion 90E3 of the adhesive layer 90E. The gap G2 communicates with a plurality of slots (or a plurality of gaps G) between a plurality of adhesion patterns P. Therefore, the air exhaustion effect of the adhesive layer 90E during the process of attaching the thin film 50B to the reflective layer 40 may be further improved, so as to avoid the accumulation of bubbles between the thin film 50B and the reflective layer 40. In other words, the flatness of the touchpad module 100b may be increased to meet the integration requirements of various applications.

Since the configuration of the adhesion patterns P of the adhesive layer 90E of this embodiment is similar to that of the adhesive layer 90 of FIG. 3A, for detailed description, please refer to the relevant paragraphs of the foregoing embodiment, as they are not repeated here. In addition, the adhesion patterns of the adhesive layer 90E may also be configured in a way similar to the adhesion patterns P' of FIG. 4A or the adhesion patterns P'" of FIG. 4B. For detailed description, please refer to the relevant paragraphs of the foregoing embodiment, as they are not repeated here.

Figure 9:
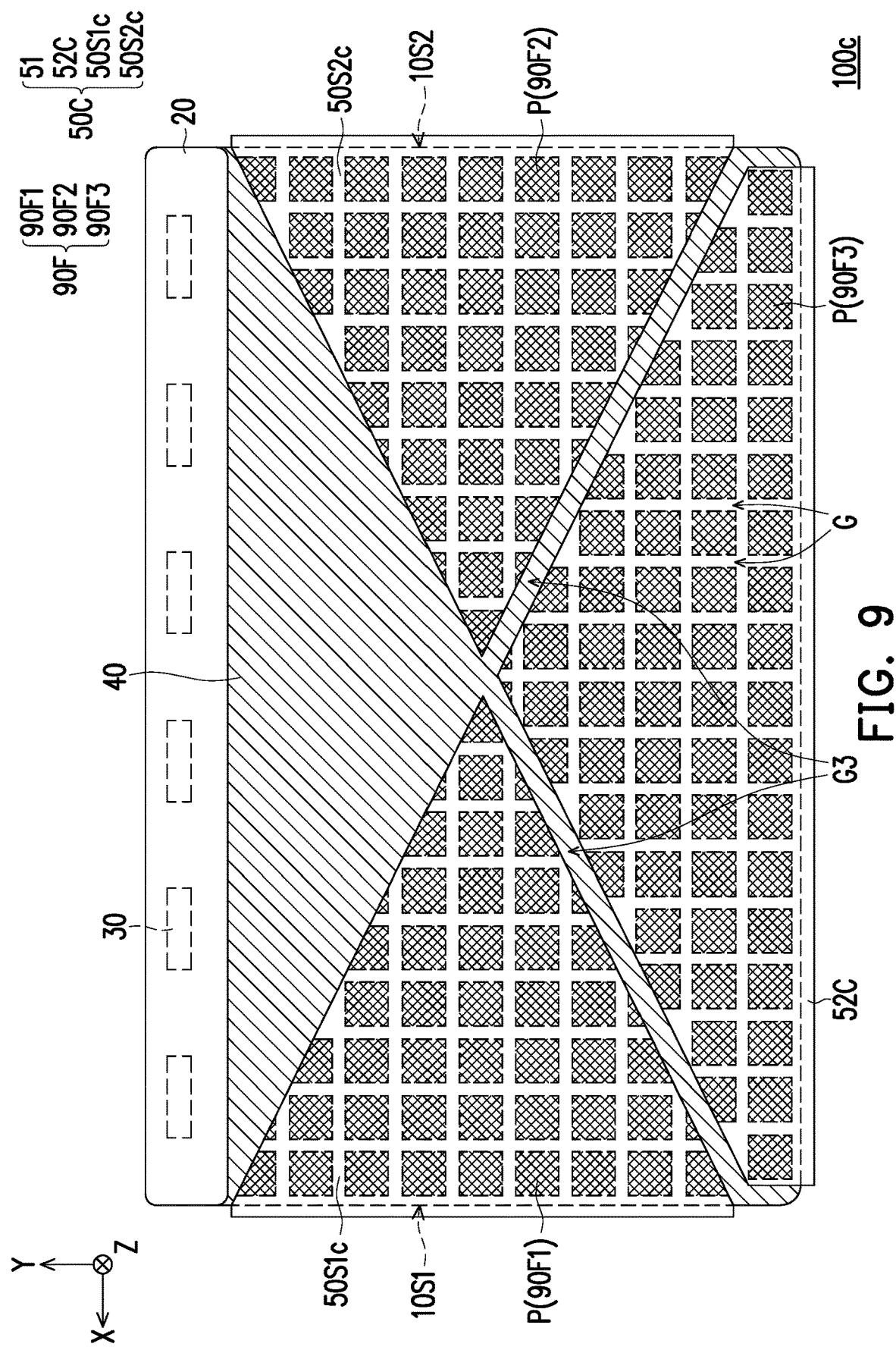
FIG. 9 is a schematic bottom view of a touchpad module according to a fourth embodiment of the present disclosure.

FIG. 9 is a schematic bottom view of a touchpad module according to a fourth embodiment of the present disclosure. In FIG. 9, the difference between the touchpad module 100c of this embodiment and the touchpad module 100b of FIG. 8 is that the first side wing 50S1c and the second side wing 50S2c of the thin film 50C of the touchpad module 100c are in different shape.

In this embodiment, the orthographic projection profiles of the first side wing 50S1c and the second side wing 50S2c of the thin film 50C on the reflective layer 40 are triangular. Since the second end side 52C, the first side wing 50S1c, and the second side wing 50S2c of the thin film 50C that are attached to the reflective layer 40 are separated from each other, there may also be a gap G3 between the first portion 90F1, the second portion 90F2, and the third portion 90F3 of the adhesive layer 90F. The gap G3 is connected to a plurality of slots (or a plurality of gaps G) between a plurality of adhesion patterns P. Therefore, the air exhaustion effect of the adhesive layer 90F during the process of attaching the thin film 50C to the reflective layer 40 may be further improved, so as to avoid the accumulation of bubbles between the thin film 50C and the reflective layer 40. In other words, the flatness of the touchpad module 100c may be increased to meet the integration requirements of various applications.

Since the configuration of the adhesion patterns P of the adhesive layer 90F of this embodiment is similar to that of the adhesive layer 90 of FIG. 3A, for detailed description, please refer to the relevant paragraphs of the foregoing embodiment, as they are not repeated here. In addition, the adhesion patterns of the adhesive layer 90F may also be configured in a way similar to the adhesion patterns P' of FIG. 4A or the adhesion patterns P'" of FIG. 4B. For detailed description, please refer to the relevant paragraphs of the foregoing embodiment, as they are not repeated here.

Figure 10:
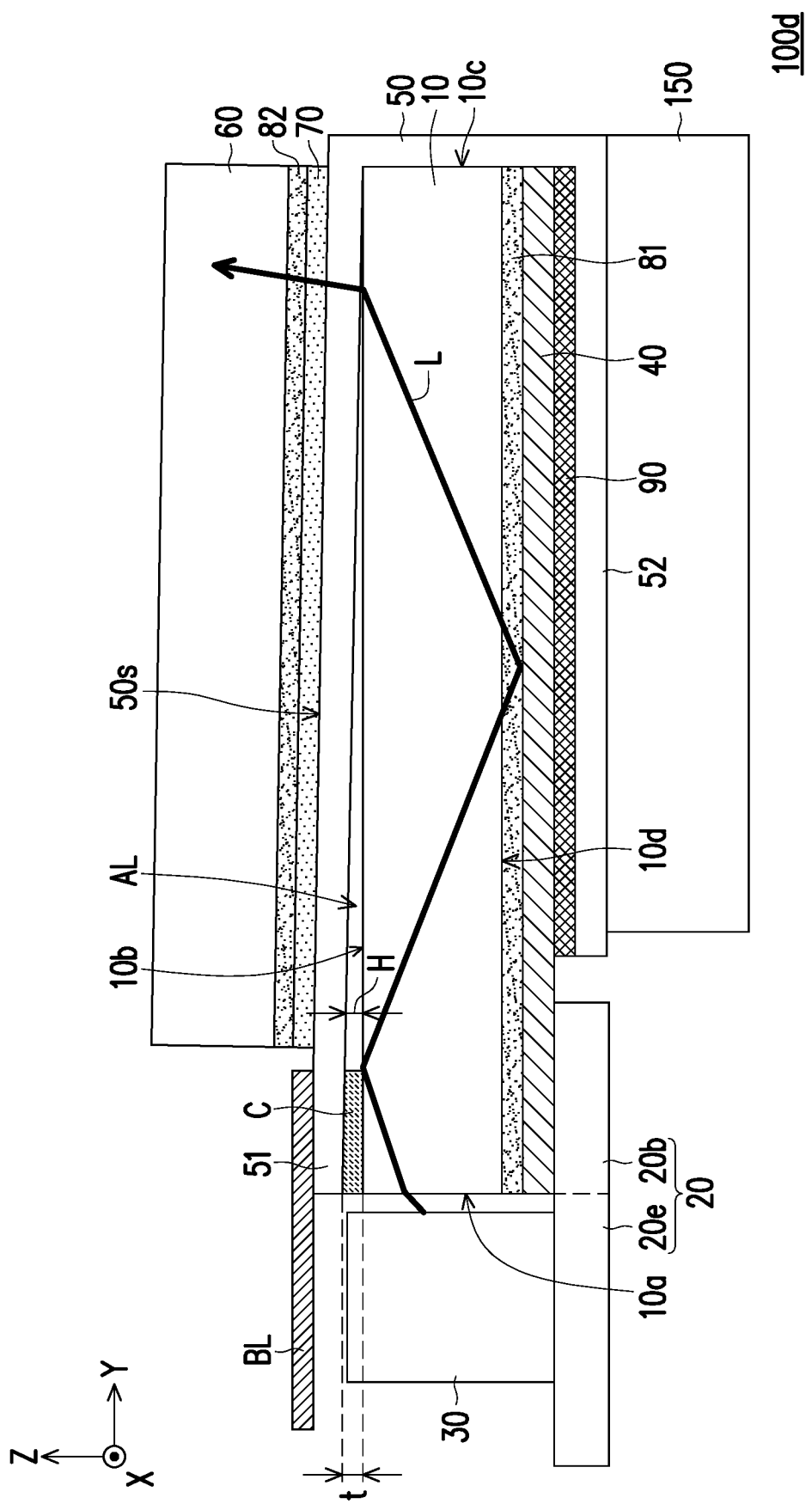
FIG. 10 is a schematic cross-sectional view of a touchpad module according to a fifth embodiment of the present disclosure.

FIG. 10 is a schematic cross-sectional view of a touchpad module according to a fifth embodiment of the present disclosure. In FIG. 10, the difference between the touchpad module 100d of this embodiment and the touchpad module 100 of FIG. 1 is that the low light-transmission layer 70 of the touchpad module 100d is disposed on a surface 50s of a thin film 50 facing a cover 60. However, the present disclosure is not limited thereto. According to other embodiments, the low light-transmission layer 70 may also be provided on the surface of the thin film 50 facing an air layer AL.

In sum, in the touchpad module of an embodiment of the present disclosure, the first end side of the thin film is fixed to the side edge area of the light-exit surface of the light guide plate connected to the light-entrance surface by the connecting member, and the second end side of the thin film is fixed to the reflective layer on the bottom of the light guide plate. The configuration of the thin film prevents the low light-transmission layer between the light guide plate and the cover from directly contacting the light guide plate, thereby solving the problem of light energy loss due to the absorption of the low light-transmission layer when light is transmitted in the light guide plate. In other words, the total brightness and the uniformity of the light emitted by the light source emerging from the light-exit surface of the light guide plate may be increased, thereby improving the taste in appearance of the touchpad module.

Although the present disclosure has been disclosed in the above embodiments, it is not intended to limit the present disclosure. Anyone with ordinary knowledge in the relevant technical field can make some changes and modifications without departing from the spirit and scope of the present disclosure. The scope of protection of the present disclosure shall be subject to those defined by the claims attached.

What is claimed is:

1. A touchpad module, comprising:
a light guide plate, having a light-exit surface, a bottom surface, a light-entrance surface, and a distant surface, wherein the light-exit surface is connected to the light-entrance surface and the distant surface, and is opposite to the bottom surface;
a circuit board, disposed on one side of the bottom surface of the light guide plate, having a base portion and an extension portion, wherein the base portion overlaps the light guide plate, and the extension portion is connected to the base portion and protrudes from the light-entrance surface;
a light source, disposed on the extension portion and located on one side of the light-entrance surface of the light guide plate;
a reflective layer, disposed on one side of the bottom surface of the light guide plate and located between the base portion of the circuit board and the light guide plate;
a thin film, overlapping the light-exit surface, the distant surface, and the bottom surface, having a first end side and a second end side opposite to each other, wherein the first end side is fixed to a side edge area of the light-exit surface connected to the light-entrance surface by a connecting member, and the second end side is fixed to the reflective layer;
a touch substrate, disposed on one side of the bottom surface of the light guide plate, wherein the thin film is located between the touch substrate and the light guide plate;
a cover, disposed on one side of the light-exit surface of the light guide plate, and the thin film is located between the cover and the light guide plate; and
a low light-transmission layer, disposed on one side of the cover facing the light guide plate.

2. The touchpad module according to claim 1, wherein an air layer is provided between the thin film and the light-exit surface.

3. The touchpad module according to claim 2, wherein a maximum height of the air layer along a first direction is equal to a thickness of the connecting member along the first direction.

4. The touchpad module according to claim 2, wherein a height of the air layer along a normal direction of the light-exit surface decreases as the air layer is further away from the connecting member.

5. The touchpad module according to claim 1, wherein the light source is adapted to emit a light toward the light-entrance surface, and the light is transmitted through the light guide plate in a direction away from the light source and emerges from the light-exit surface toward the cover.

6. The touchpad module according to claim 1, further comprising:
a light-shielding plate, disposed on one side of the thin film away from the light guide plate, and adapted to shield the side edge area of the light-exit surface and the light source.

7. The touchpad module according to claim 6, wherein the cover is attached to the thin film with a light-transmitting adhesion layer, and the connecting member is an opaque adhesion layer.

8. The touchpad module according to claim 1, wherein the second end side of the thin film is fixed to the reflective layer through an adhesive layer, and the adhesive layer has a plurality of adhesion patterns and a plurality of gaps disposed between at least part of the adhesion patterns.

9. The touchpad module according to claim 8, wherein the gaps are a plurality of slots communicating with each other, and any two adjacent ones of the adhesion patterns are provided with one of the slots.

10. The touchpad module according to claim 8, wherein the gaps are a plurality of notches, and any two adjacent ones of the at least part of the adhesion patterns are partially connected to form one of the notches.

11. The touchpad module according to claim 1, wherein: the light guide plate further has a first side surface and a second side surface; the first side surface and the second side surface are opposite to each other and are respectively connected to the light-entrance surface, the light-exit surface, the distant surface, and the bottom surface; the thin film further has a first side wing and a second side wing; and the first side wing and the second side wing respectively overlap the first side surface and the second side surface of the light guide plate, and are fixed to the reflective layer.

12. The touchpad module according to claim 11, wherein the first side wing and the second side wing of the thin film are fixed to the reflective layer through an adhesive layer, and the adhesive layer has a plurality of adhesion patterns and a plurality of gaps disposed between at least part of the adhesion patterns.

13. The touchpad module according to claim 12, wherein the gaps are a plurality of slots communicating with each other, and any two adjacent ones of the adhesion patterns are provided with one of the slots.

14. The touchpad module according to claim 12, wherein the gaps are a plurality of notches, and any two adjacent ones of the at least part of the adhesion patterns are partially connected to form one of the notches.

15. The touchpad module according to claim 12, wherein the adhesive layer is divided into a first part and a second part that are separated from each other, and the first side wing and the second side wing are fixed to the reflective layer respectively through the first part and the second part.

16. The touchpad module according to claim 1, wherein the low light-transmission layer is disposed on a surface of the cover facing the thin film.

17. The touchpad module according to claim 1, wherein the second end side of the thin film is fixed to the reflective layer through an adhesive layer, and an entire surface of the adhesive layer covers the second end side.

* * * * *